United States Patent [19]
Park

[11] Patent Number: 5,984,824
[45] Date of Patent: Nov. 16, 1999

[54] POWERTRAIN FOR A FOUR-SPEED AUTOMATIC TRANSMISSION

[75] Inventor: Jongsool Park, Kyunggi-do, Rep. of Korea

[73] Assignee: Hyundai Motor Company, Seoul, Rep. of Korea

[21] Appl. No.: 08/998,650

[22] Filed: Dec. 29, 1997

[30] Foreign Application Priority Data

Oct. 8, 1997 [KR] Rep. of Korea ...................... 97-51610

[51] Int. Cl.⁶ .................................................. F16H 3/66
[52] U.S. Cl. .......................................................... 475/275
[58] Field of Search ..................................... 475/275, 276

[56] References Cited

U.S. PATENT DOCUMENTS 5,167,593 12/1992 Pierce ....................................... 475/276
5,707,312 1/1998 Sefcik ...................................... 475/275

Primary Examiner—Dirk Wright
Attorney, Agent, or Firm—Finnegan, Henderson, Farabow, Garrett, Dunner, L.L.P.

[57] ABSTRACT

A powertrain which is used for a four-speed automatic transmission. The powertrain includes a first planetary gear unit and a second planetary gear unit. The first planetary gear unit is a first simple planetary gearset having first, second and third operating elements. The second planetary gear unit is a compound planetary gear unit including second and third simple planetary gearsets having fourth, fifth, sixth and seventh operating elements. The fourth operating element is fixedly connected to the first operating element, and the fifth operating element is variably connected to either the second operating element or the third operating element. Clutches are disposed between the fifth operating element and the second and third operating elements. Brake is interposed between at least one of the operating elements of the first and second planetary gear units to a transmission housing.

17 Claims, 15 Drawing Sheets

| SHIFT RANGE | | 34 | 36 | 40 | 42 |
|---|---|---|---|---|---|
| R | | | | ○ | ○ |
| D | 1 | ○ | | ○ | |
| | 2 | ○ | | | ○ |
| | 3 | ○ | ○ | | |
| | 4 | | ○ | | ○ |

FIG. 6

POWERTRAIN FOR A FOUR-SPEED AUTOMATIC TRANSMISSION

BACKGROUND OF THE INVENTION

1. Field of the Invention

The present invention relates to a powertrain, and more particularly, to a powertrain for a four-speed automatic transmission used in vehicles, which can accomplish four forward speeds and one reverse speed with three planetary gearsets and fourth friction elements.

2. Description of the Related Arts

Generally, automatic transmission systems for vehicles comprise a transmission control unit (TCU) which automatically controls shift ratios according to changes in a running condition of the vehicle.

The above-described TCU controls a plurality of friction elements provided in a powertrain to either operative or inoperative states to select one of the three essential elements of the planetary gearset (a sun gear, a ring gear, and a planet carrier) to be an input element, another a reaction element, and the last an output element, thereby controlling the number of output revolutions.

In a conventional powertrain for a 4-speed automatic transmission, to drive the vehicle in fourth speed overdrive, there is a need for at least one element which rotates at a higher speed than that of a final output element. This results in power loss. In addition, the large number of friction elements results in a heavy and large-size automatic transmission.

SUMMARY OF THE INVENTION

The present invention has been made in an effort to solve the problems associated with the above described conventional powertrain.

It is an object of the present invention to provide a powertrain for a four-speed automatic transmission used in vehicles which, by omitting an element which rotates at a higher speed than a final output element needed in the prior art during overdrive, can minimize power loss.

It is another object of the present invention to provide a powertrain for a four-speed automatic transmission which can be designed to be compact in size and lightweight by reducing the number of friction elements.

According to one aspect of the present invention that can achieve the above object, a powertrain for a four-speed automatic transmission comprises a first planetary gear unit comprising a first simple planetary gearset having first, second and third operating elements; a second compound planetary gear unit comprising second and third simple planetary gearsets having fourth, fifth, sixth and seventh operating elements, said fourth operating element being fixedly connected to the first operating element, and said fifth operating element being variably connected to either the second operating element or the third operating element; clutch means for variably connecting said fifth operating element to the second and third operating elements; and brake means for selectively connecting at least one of the operating elements of the first and second planetary gear units to a transmission housing.

Preferably, said first simple planetary gearset is a single pinion planetary gearset. Each of said second and third simple planetary gearsets is a single pinion planetary gearset.

According to a first embodiment of the present invention, the fourth operating element is a ring gear of the second simple planetary gearset; the fifth operating element is a combination of a planet carrier of the second simple planetary gearset and a planet carrier of the third simple planetary gearset; and the sixth and seventh elements are the respective one of a combination of a sun gear of the second simple planetary gearset and a ring gear of the third planetary gearset and a sun gear of the third planetary gearset.

According to a second embodiment of the present invention, the fourth operating element is a combination of a sun gear of the second simple planetary gearset and a sun gear of the third simple planetary gearset; the fifth operating element is a combination of a ring gear of the second simple planetary gearset and a planet carrier of the third simple planetary gearset; and the sixth and seventh operating elements are the respective one of a planet carrier of the second simple planetary gearset and a ring gear of the third simple planetary gearset.

According to a third embodiment of the present invention, the fourth operating element is a combination of a planet carrier of the second simple planetary gearset and a ring gear of the third simple planetary gearset; the fifth operating element is a combination of a ring gear of the second simple planetary gearset and a planet carrier of the third simple planetary gearset; and the sixth and seventh operating elements are the respective one of a sun gear of the second simple planetary gearset and a sun gear of the third simple planetary gearset.

Alternatively, the second simple planetary gearset can be a double pinion planetary gearset, and the third simple planetary gearset can be a single pinion planetary gearset.

According to a fourth embodiment of the present invention, the fourth operating element is a ring gear of the second simple planetary gearset; the fifth operating element is combination of a planet carrier of the second planetary gearset and a planet carrier of the third planetary gearset; and the sixth and seventh operating elements are the respective one of a combination of a sun gear of the second simple planetary gearset and a sun gear of the third simple planetary gearset and a ring gear of the third simple planetary gearset.

According to a fifth embodiment of the present invention, the fourth operating element is a combination of a ring gear of the second simple planetary gearset and a ring gear of the third simple planetary gearset; the fifth operating element is a combination of a planet carrier of the second simple planetary gearset and a planet carrier of the third simple planetary gearset; and the sixth and seventh operating element are the respective one of a sun gear of the second simple planetary gearset and a sun gear of the third simple planetary gearset.

According to a sixth embodiment of the present invention, wherein the fourth operating element is a planet carrier of the second simple planetary gearset; the fifth operating element is a combination of a ring gear of the second simple planetary gearset and a planet carrier of the third planetary gearset; and the sixth and seventh operating elements are the respective one of a combination of a sun gear of the second simple planetary gearset and a ring gear of the third simple planetary gearset, and a sun gear of the third simple planetary gearset.

Alternatively, the second simple planetary gearset can be a single pinion planetary gearset and the third simple planetary gearset can be a double pinion planetary gearset.

According to a seventh embodiment of the present invention, the fourth operating element is a planet carrier of the second simple planetary gearset; the fifth operating element is a combination of a ring gear of the second simple planetary gearset and a ring gear of the third simple planetary gearset; and the sixth and seventh operating elements are the respective one of a combination of a sun gear of the second simple planetary gearset and a sun gear of the third simple planetary gearset, and a planet carrier of the third simple planetary gearset.

According to an eighth embodiment of the present invention, the fourth operating element is a combination of a planet carrier of the second simple planetary gearset and a planet carrier of the third simple planetary gearset; the fifth operating element is a combination of a ring gear of the second simple planetary gearset and a ring gear of the third simple planetary gearset; and the sixth and seventh operating element are the respective one of a sun gear of the second simple planetary gearset and a sun gear of the third simple planetary gearset.

According to a ninth embodiment of the present invention, the fourth operating element is a ring gear of the second simple planetary gearset; the fifth operating element is a combination of a planet carrier of the second simple planetary gearset and a ring gear of the third simple planetary gearset; and the sixth and seventh elements are the respective one of a combination of a sun gear of the second simple planetary gearset and a planet carrier of the third planetary gearset and a sun gear of the third planetary gearset.

Alternatively, each of the second and third simple planetary gearsets can be a double pinion gearset.

According to a tenth embodiment of the present invention, the fourth operating element is a ring gear of the second simple planetary gearset; the fifth operating element is a combination of a planet carrier of the second simple planetary gearset and a ring gear of the third simple planetary gearset; and the sixth and seventh elements are the respective one of a combination of a sun gear of the second simple planetary gearset and a sun gear of the third planetary gearset, and a planet carrier of the third planetary gearset.

According to an eleventh embodiment of the present invention, the fourth operating element is a combination of a ring gear of the second simple planetary gearset and a planet carrier of the third simple planetary gearset; the fifth operating element is a combination of a planet carrier of the second simple planetary gearset and a ring gear of the third simple planetary gearset; and the sixth and seventh elements are the respective one of sun gears of the second simple planetary gearset and a planet carrier of the third planetary gearset.

According to a twelfth embodiment of the present invention, the fourth operating element is a combination of a ring gear of the second simple planetary gearset and a ring gear of the third simple planetary gearset; the fifth operating element is a planet carrier of the second simple planetary gearset; and the sixth and seventh elements are the respective one of a combination of a sun gear of the second simple planetary gearset and a planet carrier of the third planetary gearset and a sun gear of the third planetary gearset.

Preferably, the clutch means comprises a first clutch interposed between a planet carrier of the second simple planetary gearset and a planet carrier of the first simple planetary gearset, and a second clutch interposed between the sun gear of the first simple planetary gear and a planet carrier of the second simple planetary gearset.

Preferably, the brake means comprises a first brake for fixing one of the first, second and third operating elements and a second brake for fixing one of the fourth, fifth, sixth and seventh operating elements.

Preferably, the first brake is interposed between a planet carrier of the first simple planetary gearset and the transmission housing, and the second brake is interposed between one of sun gears of the second and third simple planetary gearsets and the transmission housing.

According to another aspect of the present invention, an automatic transmission having a power train comprises a first planetary gear unit comprising a first simple planetary gearset having first, second and third operating elements, said first operating element acting as an input element; a second compound planetary gear unit comprising second and third simple planetary gearsets having fourth, fifth, sixth and seventh operating elements, said fourth operating element acting as an output element, said fifth operating element being variably connected to the first and second operating elements, and said sixth operating element being fixedly connected to the third operating element; clutch means for variably connecting said fifth operating element to either the first operating element or the second operating element; and brake means for selectively fixing the second operating element and the seventh operating element so that the second and seventh operating elements can selectively act as a reacting element.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 6 is a chart illustrating the operation of friction elements in each shift range according to a preferred embodiment of the present invention;

DESCRIPTION OF THE PREFERRED EMBODIMENTS

Preferred embodiments of the present invention will now be described in detail with reference to the accompanying drawings.

First Embodiment

Figure 1:
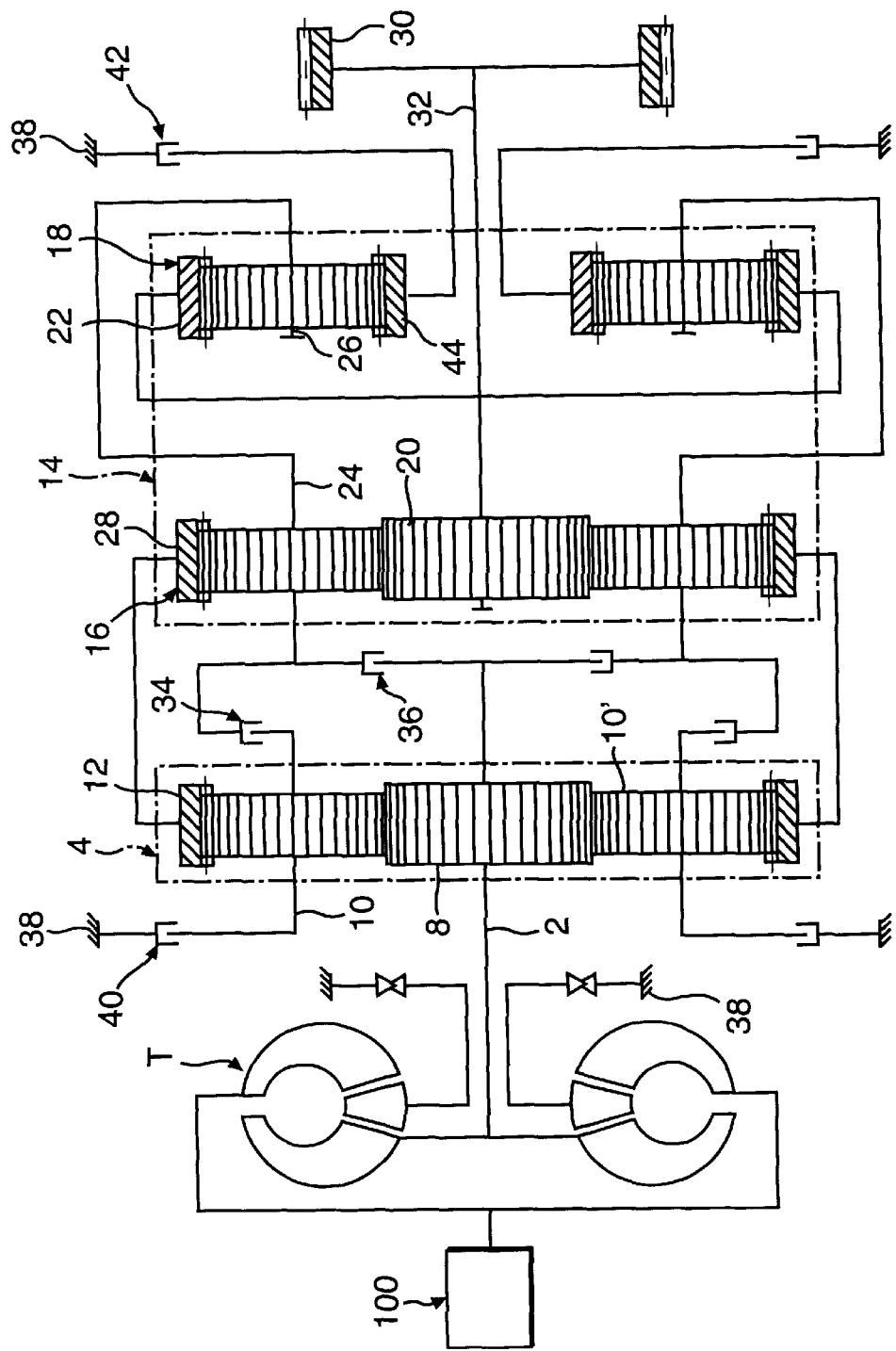
FIG. 1 is a schematic diagram of a powertrain according to a first embodiment of the present invention.

Referring first to FIG. 1, a powertrain according to a first embodiment of the present invention comprises an engine 100 for generating power, a torque converter T for multiplying torque generated from the engine 100, and first and second planetary gear units 4 and 14 for receiving multiplied torque through an input shaft 2 and for outputting four forward speeds and one reverse speed to an output gear 30.

The first planetary gear unit 4 is a simple planetary gearset that is a single pinion planetary gearset.

The first planetary gear unit 4 comprises first, second, and third operating elements. That is, the first operating element is a sun gear 8 integrally connected to the input shaft 2, the second operating element is a planet carrier 10 interconnecting pinion gears 10' disposed around the sun gear at the same distance, and the third operating element is a ring gear 12 inscribed around the pinion gears 10'.

The second planetary gear unit 14 is a compound planetary gear unit receiving power from the three operating elements of the first planetary gear unit 4 and having first and second simple planetary gearsets 16 and 18.

A sun gear 20 of the first simple planetary gearset 16 is fixedly connected to a ring gear 22 of the second simple planetary gearset 18, and a planet carrier 24 of the first simple planetary gearset 16 is fixedly connected to a planet carrier 26 of the second simple planetary gearset 18. Therefore, the second planetary gear unit 14 becomes the compound planetary gear unit having fourth, fifth, sixth and seventh operating elements. That is, the fourth operating element is a combination of the sun gear 20 of the first simple planetary gearset 16 and the ring gear 22 of the second simple planetary gearset 18, the fifth operating element is a combination of the planet carrier 24 of the first simple planetary gearset 16 and the planet carrier 26 of the second simple planetary gearset 18, the sixth operating element is a ring gear 28 of the first simple planetary gearset 16, and the seventh operating element is a sun gear 44 of the second simple planetary gearset 18.

The ring gear 28 of the first simple planetary gearset 16 is fixedly connected to the ring gear 28 of the first planetary gear unit 4. The planet carrier 24 of the first simple planetary gearset 16 is variably connected to either the planet carrier 10 or the sun gear 8 of the first planetary gear unit 4 by clutch means.

The sun gear 20 of the first simple gearset 16 acts as an output element by being further connected to an output shaft 32 connected to the output gear 30.

In FIG. 1, a structure of a differential gear connected to the output gear 30 is omitted since the structure is well known to one of ordinary skill in the art.

The clutch means comprises a first clutch 34 interposed between the planet carrier 24 of the first simple planetary gearset 16 and the planet carrier 10 of the first planetary gear unit 4 and a second clutch 36 interposed between the planet carrier 24 of the first simple planetary gearset 16 and the sun gear 8 of the first planetary gear unit 4. The first clutch 34 is operated in forward first, second and third speeds, while the second clutch 36 is operated in the forward third and fourth speeds.

In addition, there is provided brake means for operating some of the operating elements of the first and second planetary gear units 4 and 14 as reacting elements. The brake means comprises a first brake 40 interposed between the planet carrier 10 of the first planetary gear unit 4 and a transmission housing 38 and a second brake 42 interposed between the sun gear 44 of the second simple planetary gearset 18 of the second planetary gear unit 14 and the transmission housing 38. The first brake 40 is operated in the forward first speed and the reverse first speed, while the second brake 42 is operated in the forward second and fourth speeds and the reverse first speed.

Figure 2:
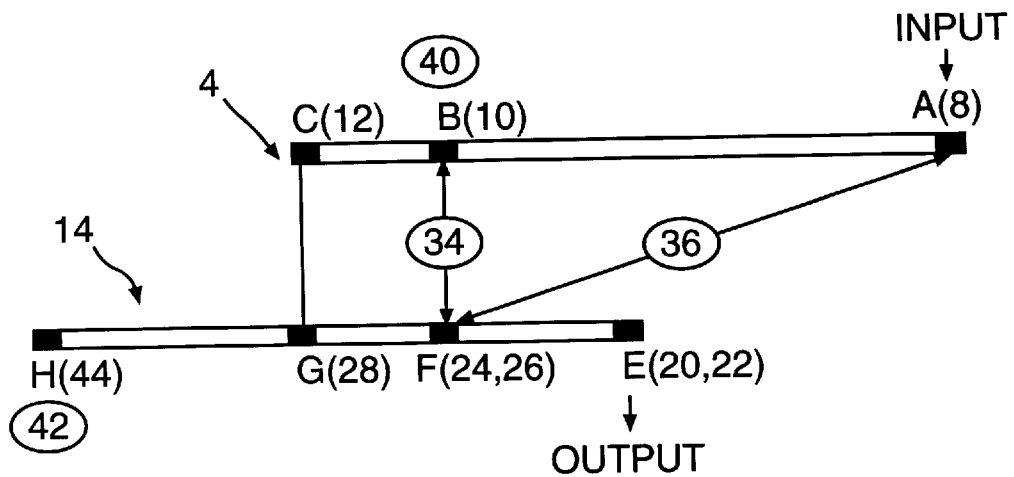
FIG. 2 is a lever analogy diagram illustrating a powertrain according to a preferred embodiment of the present invention.

The above described powertrain can be further described in a lever analogy diagram as shown in FIG. 2.

In the lever analogy diagram shown in FIG. 2, the first operating element A indicates the sun gear 8, the second operating element B indicates the planet carrier 10, and the third operating element C is the ring gear 12.

The fourth operating element E indicates the combination of the sun gear 20 of the first simple planetary gearset 16 and the ring gear 22 of the second simple planetary gearset 18, the fifth operating element F indicates the combination of the planet carrier 24 of the first simple planetary gearset 16 and the planet carrier 26 of the second simple planetary gearset 18, the sixth operating element G is the ring gear 28 of the first simple planetary gearset 16, and the seventh operating element H is the sun gear 44 of the second simple planetary gearset 18.

As described above, the first clutch 34 is interposed between the second operating element B and the fifth operating element F, and the second clutch 36 is interposed between the first operating element A and the fifth operating element F. The first brake 40 is interposed between the second operating element B and the transmission housing 38, and the second brake 42 is interposed between the seventh operating element H and the transmission housing 38.

Figure 3:
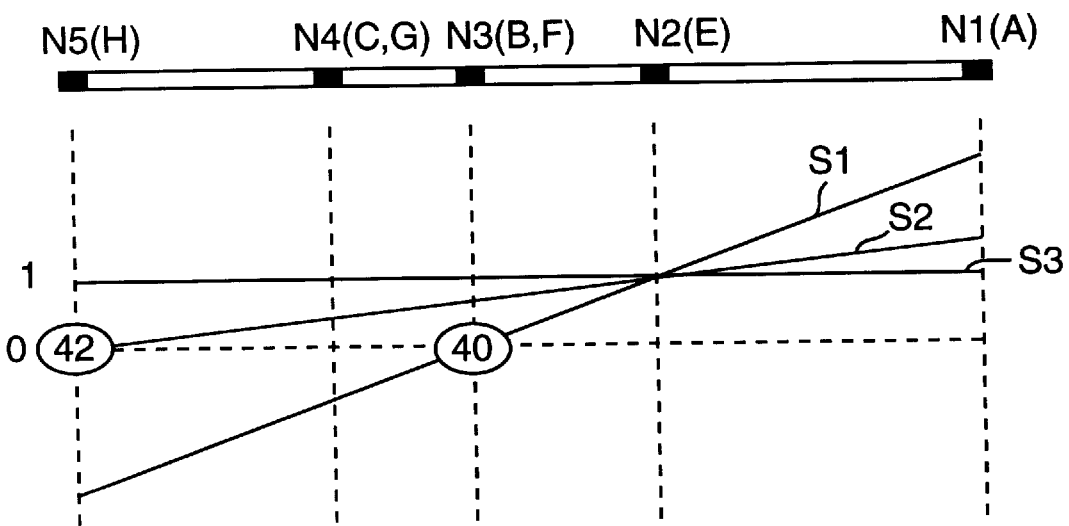
FIG. 3 is a schematic diagram illustrating an operation of forward first, second and third speeds of a powertrain according to a preferred embodiment of the present invention through a lever analogy diagram.

The lever analogy diagram of FIG. 2 can be further described in another lever analogy diagram in forward first, second and third speeds as shown in FIG. 3 since the first clutch 36 is operated in the first, second and third speeds.

In the lever analogy diagram of FIG. 3, a first operating node N1 indicates the first operating element A of the first planetary gear unit 4, a second operating node N2 indicates the fourth operating element E of the second planetary gear unit 14, a third operating node N3 denotes the combination of the second operating element B of the first planetary gear unit 4 and the fifth operating element F of the second planetary gear unit 14, a fourth operating node N4 denotes the combination of the third operating element C of the first planetary gear unit 4 and the sixth operating element G of the second planetary gear unit 14, and a fifth operating node N5 indicates the seventh operating element H of the second planetary gear unit 14.

The shifting process of the forward first, second and third speeds will be explained hereinafter using the chart of FIG. 6 and the lever analogy diagram of FIG. 3.

FORWARD FIRST SPEED

In the forward first speed, the first clutch 34 and the first brake 40 are operated. Accordingly, the first operating node N1 indicating the sun gear 8 of the first planetary gear unit 4 becomes the input element, and the third operating node N3 indicating the combination of the planet carriers 24 and 26 of the first and second simple planetary gearsets 16 and 18 becomes the reacting element.

Accordingly, the forward first speed is outputted through the output gear 30 fixed to the second operating node N2 indicating the sun gear 20 of the first simple planetary gearset 16.

That is, when assuming the sun gear 20 output revolution number is "1", a line connecting the output point of the second operating node N2 to the third operating node N3, acting as the reacting element, becomes the first speed line S1. At this point, the number of input revolutions of the first operating node N1 becomes the first input speed which is higher than the output speed "1". This shows that speed reduction is realized.

In the first speed state, the ring gears 12 and 28 of the fourth operating node N4 and the sun gear 44 of the seventh operating node N5 rotate in the opposite direction of the output.

FORWARD SECOND SPEED

If throttle opening is increased in the forward first speed state, the first brake 40 is disengaged, while the second brake 42 is operated. Accordingly, the first operating node N1 indicating the sun gear 8 of the first planetary gear unit 4 becomes the input element, while the fifth operating node N5 denoting the sun gear 44 of the second simple planetary gearset 18 becomes a reacting element by the operation of the second brake 42.

Accordingly, the forward first speed is outputted through the output gear 30 fixed to the second operating node N2 indicating the sun gear 20 of the first simple planetary gearset 16.

That is, if assuming the sun gear 20 output revolution number is "1", a line connecting the output speed point of the second operating node N2, acting as an output element, to the fifth operating node N5, acting as the reacting element, becomes the second speed line S2. At this point, the number of input revolutions of the first operating node N1 becomes the second input speed which is higher than the output speed "1". This shows that speed reduction is realized. In addition, when comparing with the first speed line S1, the number of input revolutions of the second speed is less than that of the first speed.

In this forward second speed state, the operating elements of the third and fourth operating nodes N3 and N4 rotate in the input direction at a number of revolutions less than that of the output.

FORWARD THIRD SPEED

If the throttle opening is increased in the forward is second speed state, the first and third clutches 34 and 36 are simultaneously operated. Accordingly, since the first and second planetary units 4 and 14 are locked as the input is realized through the first operating node N1 the input becomes the same as the output. As a result, the output becomes a third speed line S3. This shows that neither gear reduction nor overdrive occurs.

FORWARD FOURTH SPEED

Figure 4:
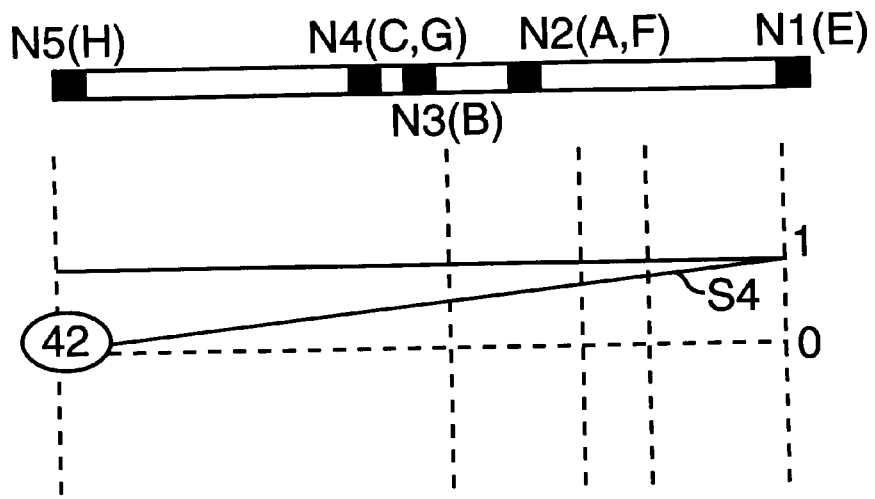
FIG. 4 is a schematic diagram illustrating an operation of forward fourth speed of a powertrain according to a preferred embodiment of the present invention through a lever analogy diagram.
Figure 6:
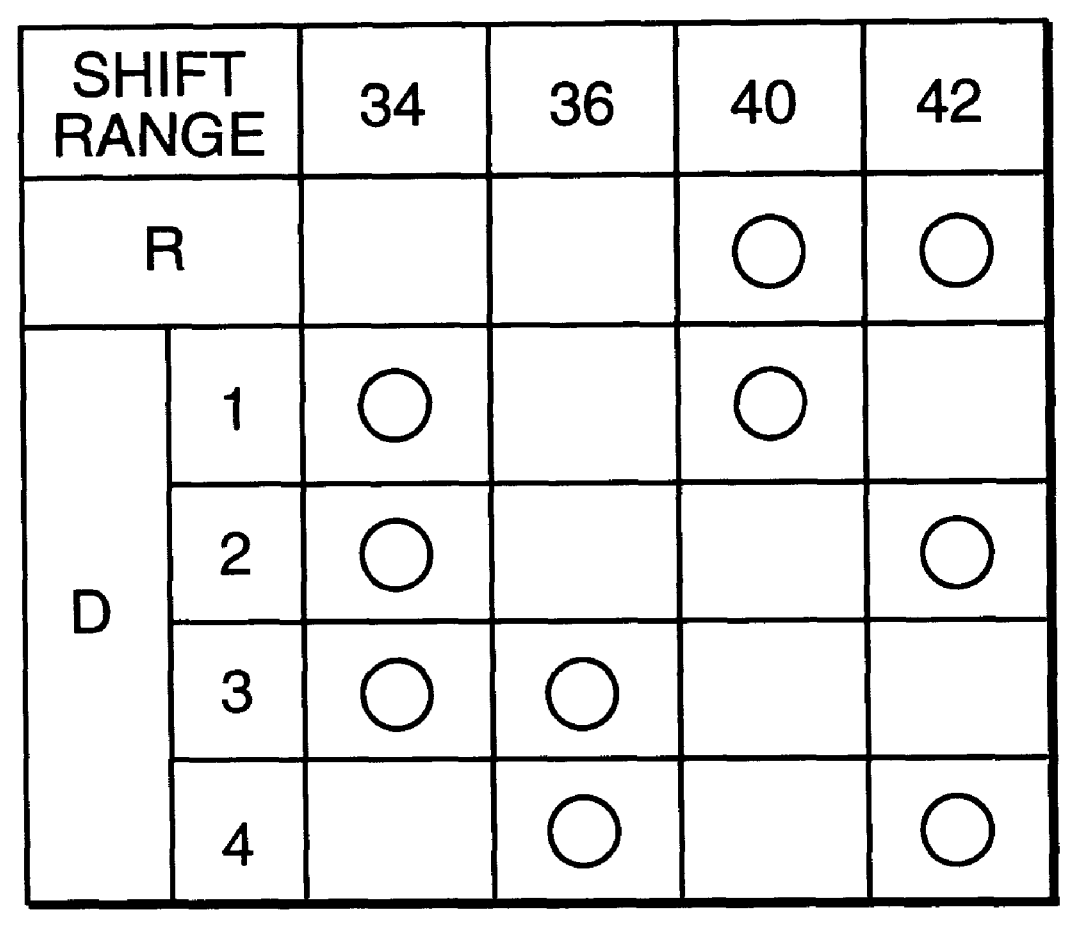

In the forward fourth speed, since the second clutch 36 and the second brake 42 are operated as shown in FIG. 6, the lever analogy diagram of FIG. 2 can be further illustrated as shown in FIG. 4.

That is, as shown in FIG. 4, the first operating node N1 indicates the fourth operating element E of the second planetary gear unit 14, the second operating node N2 indicates the combination of the first operating element A of the first planetary gear unit 4 and the fifth operating element F of the second planetary gear unit 14, the third operating node N3 indicates the second operating element B of the first planetary gear unit 4, the fourth operating node N4 indicates the combination of the third operating element C of the first planetary gear unit 4 and the sixth operating element G of the second planetary gear unit 14, and the fifth operating node N5 indicates the seventh operating element H of the second planetary gear unit 14.

Therefore, the fifth operating node N5 indicating the seventh operating element H becomes a reacting element by the operation of the second clutch 36, and the first operating node N1 indicating the fourth operating element E becomes an output element.

Accordingly, the forward fourth speed is outputted through the output gear 30 fixed to the second operating node N2 indicating the sun gear 20 of the first simple planetary gearset 16.

That is, when assuming the sun gear 20 output revolution number is "1", a line connecting the output speed point of the first operating node N1 to the fifth operating node N5, acting as the reacting element, becomes a fourth speed line D4. At this point, the number of input revolutions of the second operating node N2 becomes the fourth input speed which is less than the output speed "1". This shows that speed increase is realized. That is, the fourth speed state is an overdrive in which output speed is higher than the input speed.

In the fourth speed state, all the operating elements of the third and fourth operating nodes N3 and N4 idle in the output direction at the number of revolutions less than that of the output. Therefore, since there is no operating element which idles at the number of revolutions higher than that of output, power loss is prevented.

REVERSE SPEED

When a shift mode is selected to a reverse mode, the first and second clutches 34 and 36 are disengaged, and the first and second brakes 40 and 42 are engaged.

Accordingly, since the second operating element B and the seventh operating element H are fixed to each other. Therefore, the powertrain can be further illustrated in a lever analogy diagram as shown in FIG. 5.

Figure 5:
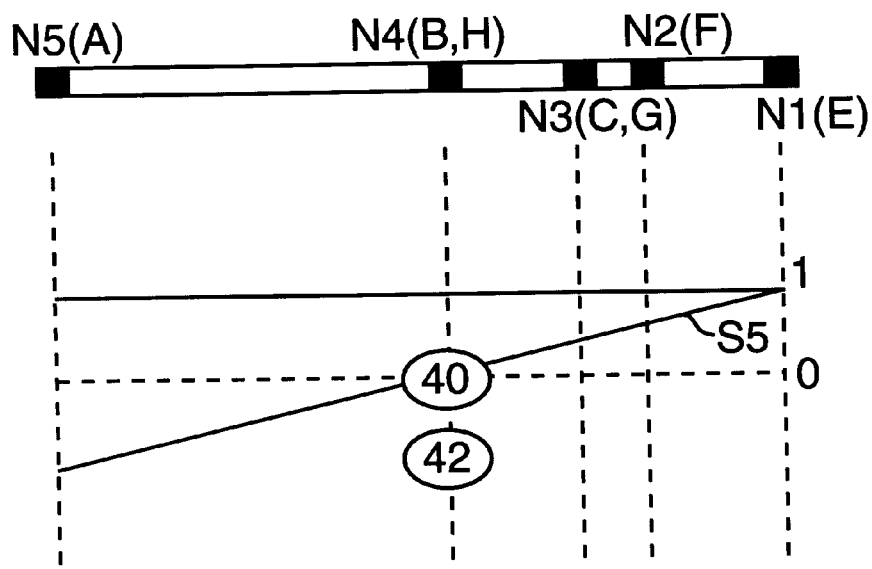
FIG. 5 is a schematic diagram illustrating an operation of reverse speed of a powertrain according to a preferred embodiment of the present invention through a lever analogy diagram.

That is, in FIG. 5, the first operating node N1 indicates the fourth operating element E of the second planetary gear unit 14, the second operating node N2 indicates the fifth operating element F of the second planetary gear unit 14, the third operating node N3 indicates the combination of the third operating element C of the first planetary gear unit 4 and the sixth operating element G of the second planetary gear unit 14, the fourth operating node N4 indicates the combination of the second operating element B of the first planetary gear unit 4 and the seventh operating element H of the second planetary gear unit 14, and the fifth operating node N5 denotes the first operating element of the first planetary gear unit 4.

As described above, since the first and second clutches 34 and 36 are disengaged, while the first and second brakes 40 and 42 are operated, the fifth operating node N5 indicating the sun gear 8 of the first planetary gear unit 4 becomes the input element, and the fourth operating node N4 becomes the reacting element by the operations of the first and second brakes 40 and 42.

Accordingly, the reverse speed is outputted through the output gear 30 fixed to the second operating node N2 indicating the sun gear 20 of the first simple planetary gearset 16.

That is, when assuming the sun gear 20 output revolution number is "1", a line connecting the output speed point of the first operating node N1 to the fourth operating node N5, acting as the reacting element, becomes the reverse speed line S5.

In FIG. 5, since the output is assumed to be "1", the input seems to be realized below "0". However, this does not mean that the input is reversely realized, but is merely a result of the assumed value given to the input.

Second Embodiment

Figure 7:
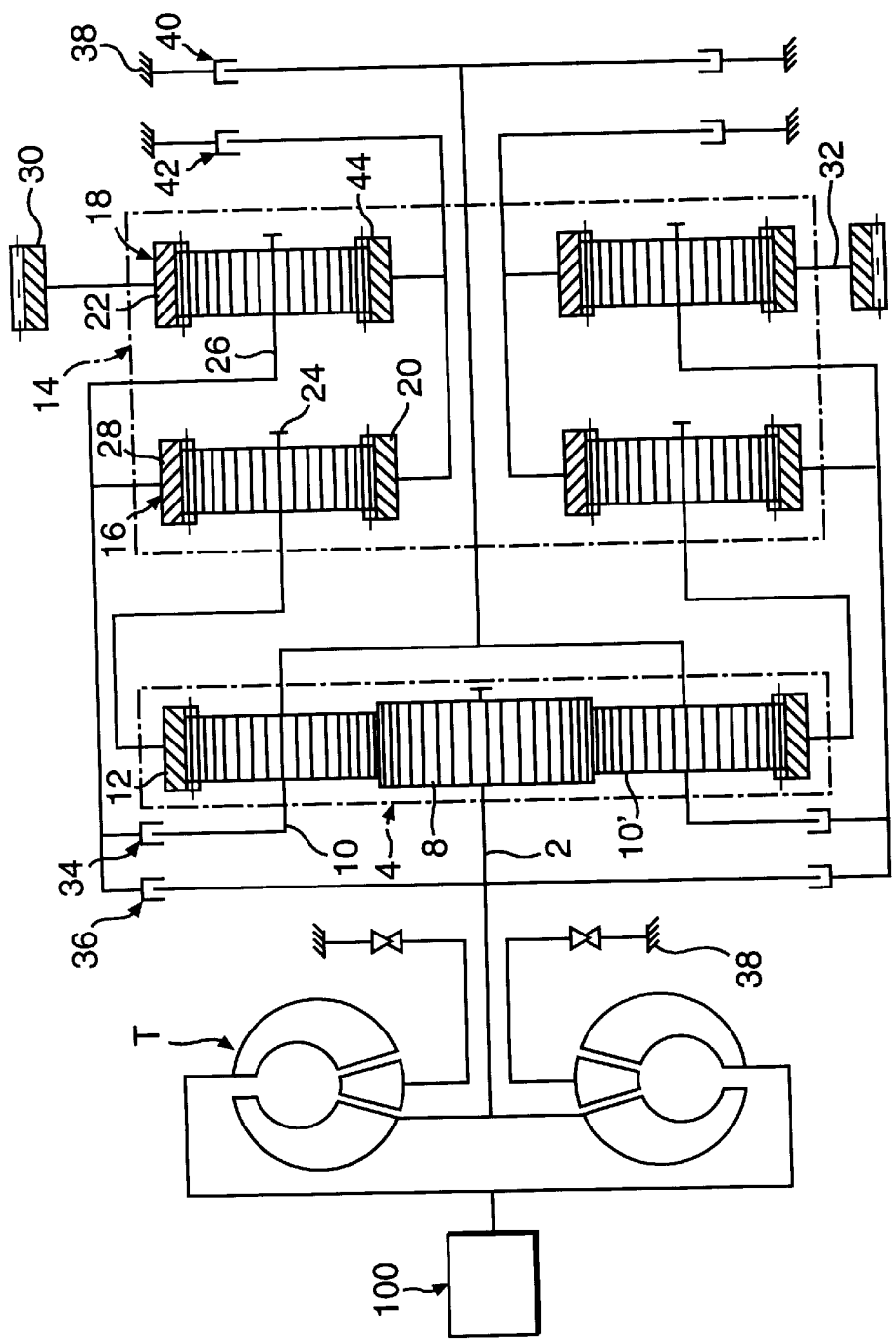
FIG. 7 is a schematic diagram of a powertrain according to a second embodiment of the present invention.

FIG. 7 shows a powertrain according to a second embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. Sun and ring gears 20 and 28 of the first simple planetary gearset 16 are fixedly connected to a sun gear 44 and planet carrier 26 of the second simple planetary gearset 18, respectively.

In addition, a planet carrier 24 of the first simple planetary gearset 16 is fixedly connected to a ring gear 12 of the first planetary gear unit 4, while the ring gear 28 of the first simple planetary gearset 16 is variably connected to a planet carrier 10 and sun gear 8 of the first planetary gear unit 4. A first clutch 34 is interposed between the ring gear 28 and the planet carrier 10. A second clutch 36 is interposed between the ring gear 28 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 44 of the second simple planetary gearset 18 and the transmission housing 38 so that the sun gear 44 can selectively operate as a reacting element.

The ring gear 22 of the second simple planetary gearset 18 is fixedly connected to an output gear 30 to act as an output element.

Therefore, the first planetary gear unit 4 comprises first, second, and third operating elements A, B and C. That is, a first operating element A is the sun gear 8, the second operating element B is a planet carrier 10, and the third operating element C is a ring gear 12.

In addition, the second planetary gear unit 14 is comprised of a fourth operating element E having the ring gear 22 of the second simple planetary gearset 18, a fifth operating element F having the ring gear 28 of the first simple planetary gearset 16 and the planet carrier 26 of the second simple planetary gearset 18, a sixth operating element G having the planet carrier 24 of the first simple planetary gearset 16, a seventh operating element H having the sun gear 20 of the first simple planetary gearset 16 and the sun gear of the second simple planetary gearset 18.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Third Embodiment

Figure 8:
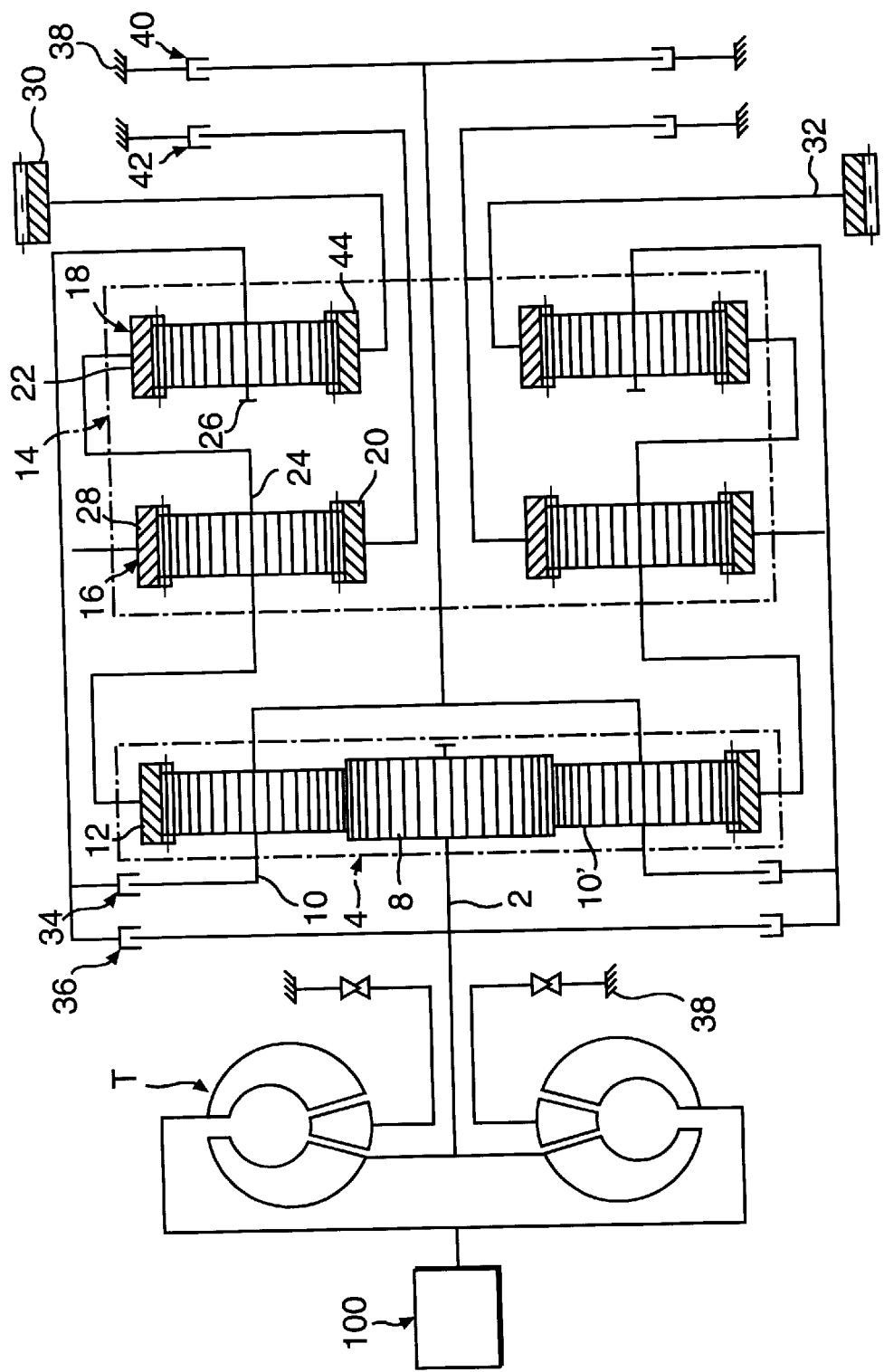
FIG. 8 is a schematic diagram of a powertrain according to a third embodiment of the present invention.

FIG. 8 shows a powertrain according to a third embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. A ring gear 28 and planet carrier 24 of the first simple planetary gearset 16 are fixedly connected to a planet carrier 26 and a ring gear 22 of the second simple planetary gearset 18, respectively.

In addition, a planet carrier 24 of the first simple planetary gearset 16 is fixedly connected to a ring gear 12 of the first planetary gear unit 4, while the ring gear 28 of the first simple planetary gearset 16 is variably connected to either a planet carrier 10 or a sun gear 8 of the first planetary gear unit 4. A first clutch 34 is interposed between the ring gear 28 and the planet carrier 10. A second clutch 36 is interposed between the ring gear 28 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 20 of the first simple planetary gearset 18 and the transmission housing 38 so that the sun gear 44 can selectively operate as a reacting element.

The sun gear 44 of the second simple planetary gearset 18 is fixedly connected to an output gear 30 to act as an output element.

Therefore, the first planetary gear unit 4 comprises first, second, and third operating elements A, B and C. That is, the first operating element A is a sun gear 8, the second operating element B is a planet carrier 10, and the third operating element C is a ring gear 12.

In addition, the second planetary gear unit 14 is comprised of a fourth operating element E having the sun gear 44 of the second simple planetary gearset 18, a fifth operating element F having the ring gear 28 of the first simple planetary gearset 16 and the planet carrier 26 of the second simple planetary gearset 18, a sixth operating element G having the planet carrier 24 of the first simple planetary gearset 16 and the ring gear 22 of the second simple planetary gearset 18, and a seventh operating element H having the sun gear 20 of the first simple planetary gearset 16.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Fourth Embodiment

Figure 9:
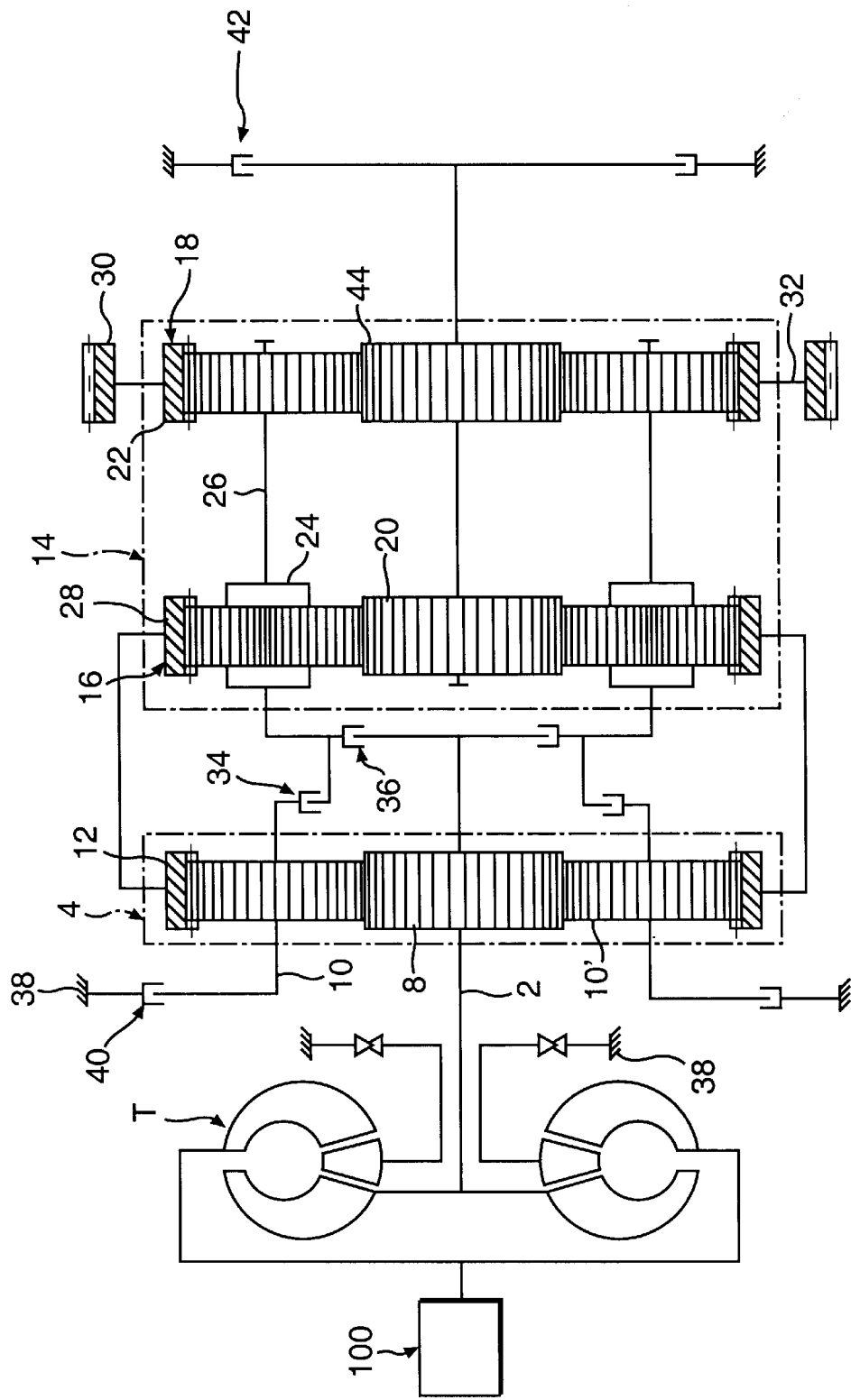
FIG. 9 is a schematic diagram of a powertrain according to a fourth embodiment of the present invention.

FIG. 9 shows a powertrain according to a fourth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. The first simple planetary gearset 16 is a double pinion planetary gearset. A sun gear 20 and a planet carrier 24 of the first simple planetary gearset 16 are fixedly connected to a sun gear 44 and planet carrier 26 of the second simple planetary gearset 18, respectively.

In addition, a ring gear 28 of the first simple planetary gearset 16 is fixedly connected to a ring gear 12 of the first planetary gear unit 4, while the planet carrier 24 of the first simple planetary gearset 16 is variably connected to either a planet carrier 10 or a sun gear 8 of the first planetary gear unit 4. A first clutch 34 is interposed between the planet carrier 24 and the planet carrier 10. A second clutch 36 is interposed between the planet carrier 24 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 44 of the second simple planetary gearset 18 and the transmission housing 38 so that the sun gear 44 can selectively operate as a reacting element.

The ring gear 22 of the second simple planetary gearset 18 is fixedly connected to an output gear 30 to act as an output element.

Therefore, the first planetary gear unit 4 comprises first, second, and third operating elements A, B and C. That is, the first operating element A is the sun gear 8, the second operating element B is a planet carrier 10, and the third operating element C is a ring gear 12.

In addition, the second planetary gear unit 14 is comprised of a fourth operating element E having the ring gear 22 of the second simple planetary gearset 18, a fifth operating element F having the planet carrier 24 of the first simple planetary gearset 16 and the planet carrier 26 of the second simple planetary gearset 18, a sixth operating element G having the ring gear 28 of the first simple planetary gearset 16, and a seventh operating element H having the sun gear 20 of the first simple planetary gearset 16 and the sun gear 44 of the second planetary gearset 18.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Fifth Embodiment

Figure 10:
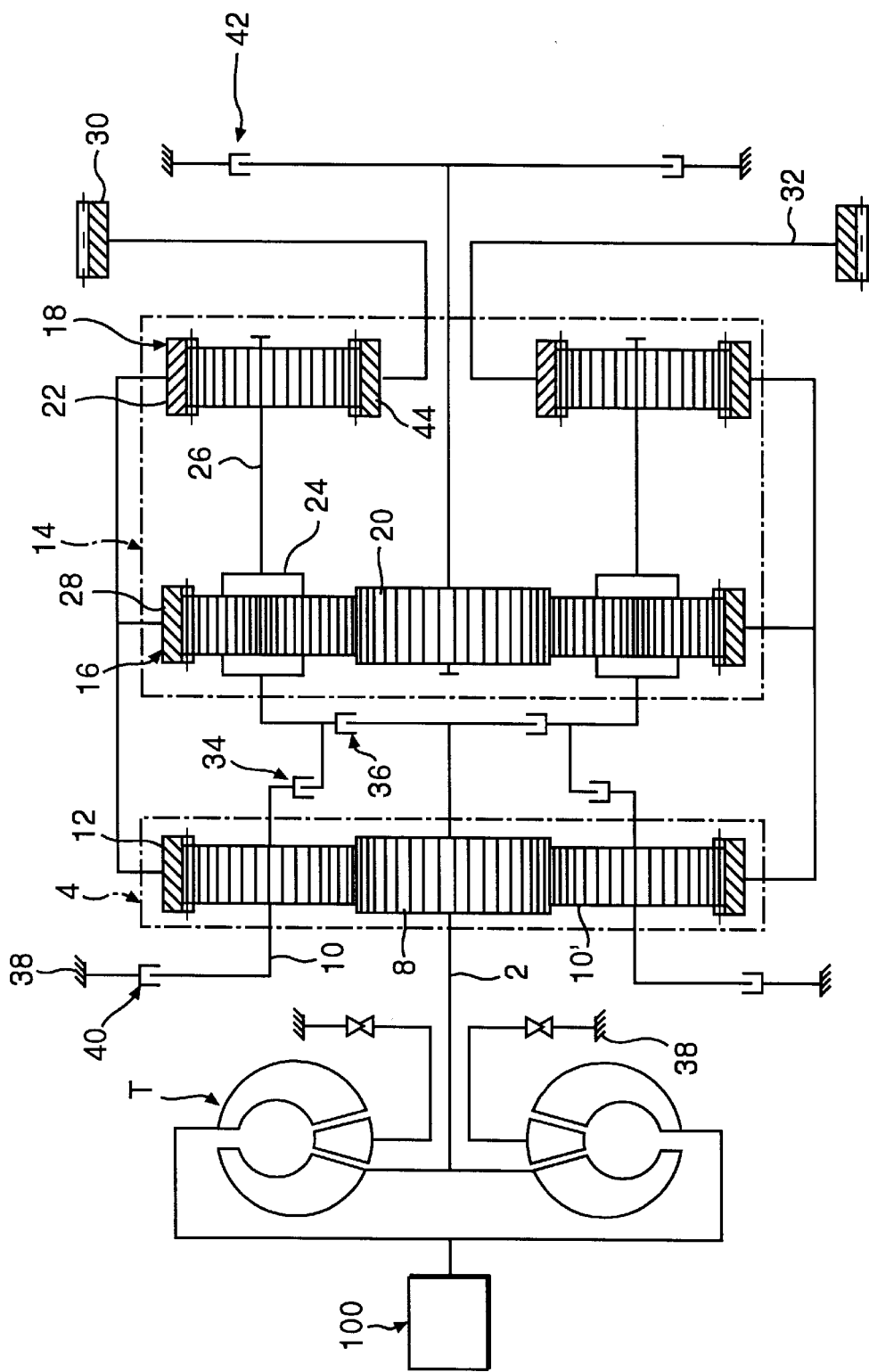
FIG. 10 is a schematic diagram of a powertrain according to a fifth embodiment of the present invention.

FIG. 10 shows a powertrain according to a fifth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. The first simple planetary gearset 16 is a double pinion planetary gearset. A planet carrier 24 and ring gear 28 of the first simple planetary gearset 16 are fixedly connected to a planet carrier 26 and ring gear 22 of the second simple planetary gearset 18, respectively.

In addition, the ring gear 28 of the first simple planetary gearset 16 is fixedly connected to a ring gear 12 of the first planetary gear unit 4, while the planet carrier 24 of the first simple planetary gearset 16 is variably connected to either a planet carrier 10 or a sun gear 8 of the first planetary gear unit 4. A first clutch 34 is interposed between the planet carrier 24 and the planet carrier 10. A second clutch 36 is interposed between the planet carrier 24 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 20 of the first simple planetary gearset 18 and the transmission housing 38 so that the sun gear 20 can selectively operate as a reacting element.

The sun gear 44 of the second simple planetary gearset 18 is fixedly connected to an output gear 30 to act as an output element.

Therefore, the first planetary gear unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the sun gear 44 of the second simple planetary gearset 18, a fifth operating element F having the planet carrier 24 of the first simple planetary gearset 16 and the planet carrier 26 of the second simple planetary gearset 18, a sixth operating element G having the ring gear 28 of the first simple planetary gearset 16 and the ring gear 22 of the second simple planetary gearset 18, and a seventh operating element H having the sun gear 20 of the first simple planetary gearset 16.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Sixth Embodiment

Figure 11:
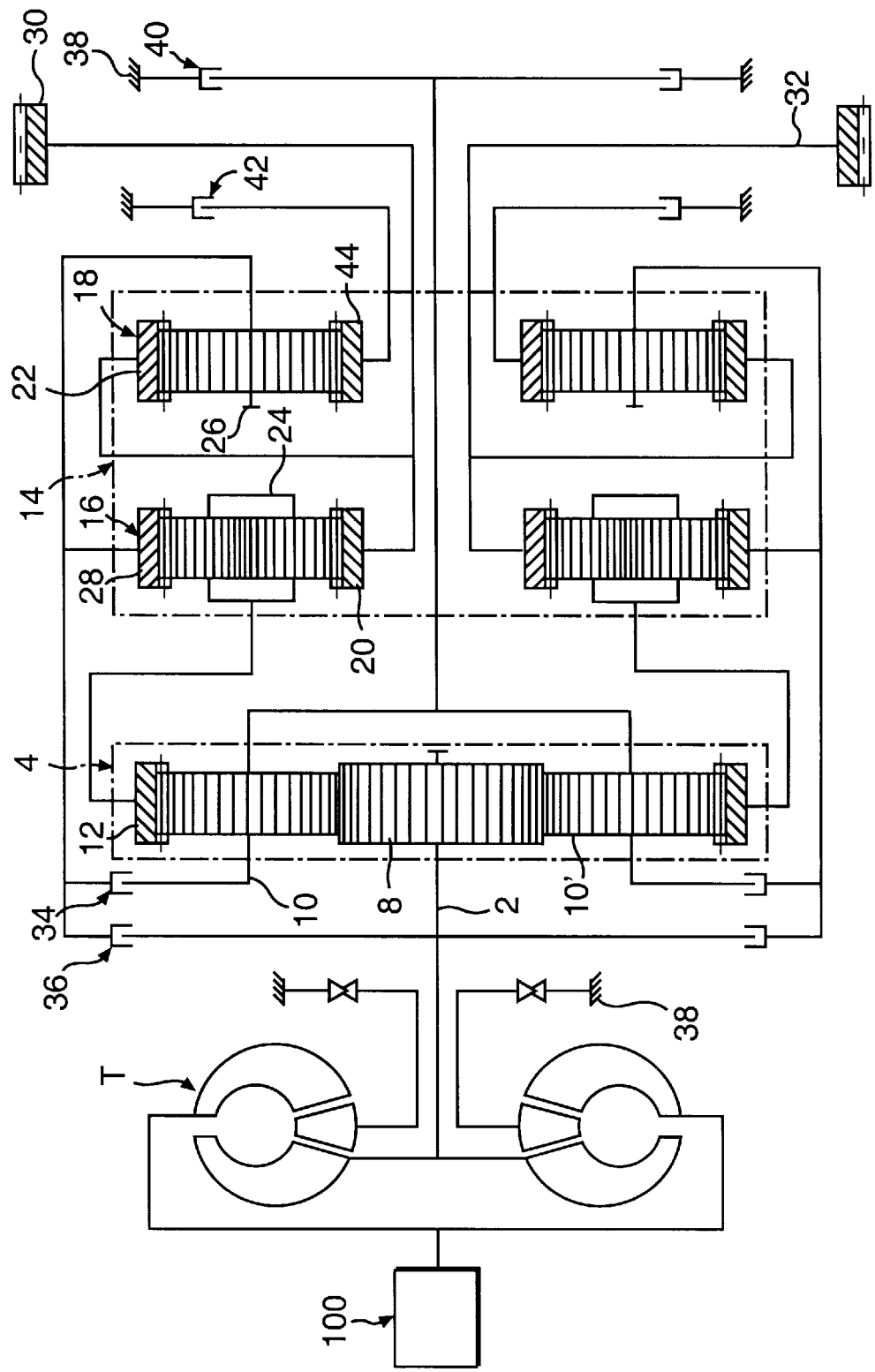
FIG. 11 is a schematic diagram of a powertrain according to a sixth embodiment of the present invention.

FIG. 11 shows a powertrain according to a sixth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. The first simple planetary gearset 16 is a double pinion planetary gearset. Sun and ring gears 20 and 28 of the first simple planetary gearset 16 are fixedly connected to a ring gear 22 and a planet carrier 26 of the second simple planetary gearset 18, respectively.

In addition, a planet carrier 24 of the first simple planetary gearset 16 is fixedly connected to a ring gear 12 of the first planetary gear unit 4, while the ring gear 28 of the first simple planetary gearset 16 is variably connected to either a planet carrier 10 or a sun gear 8 of the first planetary gear unit 4. A first clutch 34 is interposed between the ring gear 28 and the planet carrier 10. A second clutch 36 is interposed between the ring gear 28 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 44 of the second simple planetary gearset 18 and the transmission housing 38 so that the sun gear 44 can selectively operate as a reacting element.

The ring gear 22 of the second simple planetary gearset 18 is fixedly connected to an output gear 30 to act as an output element.

Therefore, the first planetary gear unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the sun gear 20 of the first simple planetary gearset 16 and the ring gear 22 of the second simple planetary gearset 18, a fifth operating element F having the ring gear 28 of the first simple planetary gearset 16 and the planet carrier 26 of the second simple planetary gearset 18, a sixth operating element G having the planet carrier 24 of the first simple planetary gearset 16, and a seventh operating element H having the sun gear 44 of the second simple planetary gearset 18.

The sixth operating element G of the second planetary gear unit 14 is fixedly connected to the third operating element C of the first planetary gear unit 4, the fifth operating element F of the second planetary gear unit 14 is selectively connected to the first or second operating element A or B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Seventh Embodiment

Figure 12:
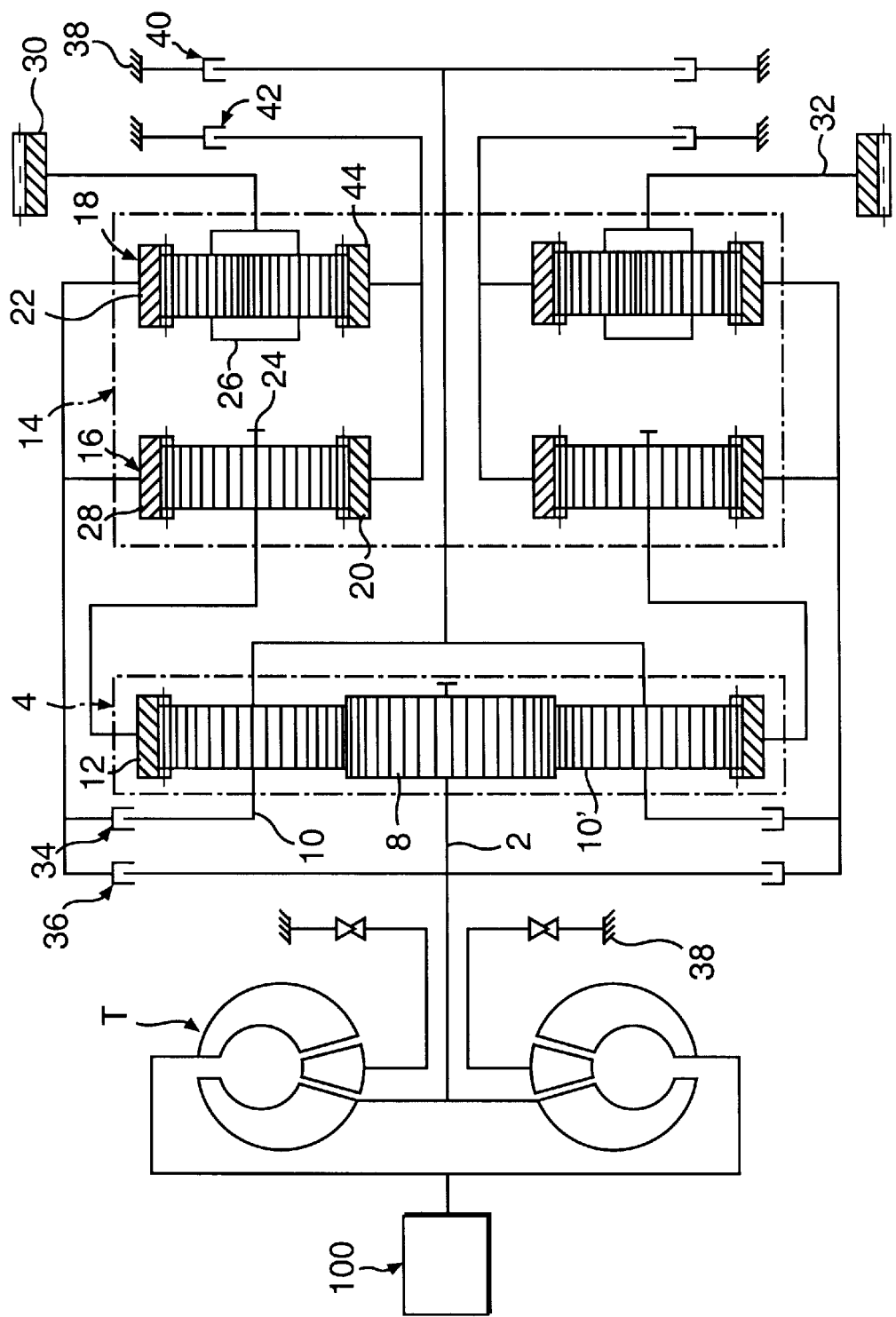
FIG. 12 is a schematic diagram of a powertrain according to a seventh embodiment of the present invention.

FIG. 12 shows a powertrain according to a seventh embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. The second simple planetary gearset 18 is a double pinion planetary gearset. Sun and ring gears 20 and 28 of the first simple planetary gearset 16 are fixedly connected to sun and ring gears 44 and 22 of the second simple planetary gearset 18, respectively.

In addition, a planet carrier 24 of the first simple planetary gearset 16 is fixedly connected to a ring gear 12 of the first planetary gear unit 4, while the ring gear 28 of the first simple planetary gearset 16 is variably connected to either a planet carrier 10 or a sun gear 8 of the first planetary gear unit 4. A first clutch 34 is interposed between the ring gear 28 and the planet carrier 10. A second clutch 36 is interposed between the ring gear 28 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 44 of the second simple planetary gearset 18 and the transmission housing 38 so that the sun gear 44 can selectively operate as a reacting element.

The planet carrier 26 of the second simple planetary gearset 18 is fixedly connected to an output gear 30 to act as an output element.

Therefore, the first planetary gearset unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the planet carrier 26 of the second simple planetary gearset 18, a fifth operating element F having the ring gear 28 of the first simple planetary gearset 16 and the ring gear 22 of the second simple planetary gearset 18, a sixth operating element G having the planet carrier 24 of the first simple planetary gearset 16, and a seventh operating element H having the sun gear 20 of the first simple planetary gearset 16 and the sun gear 44 of the second simple planetary gearset 18.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Eighth Embodiment

Figure 13:
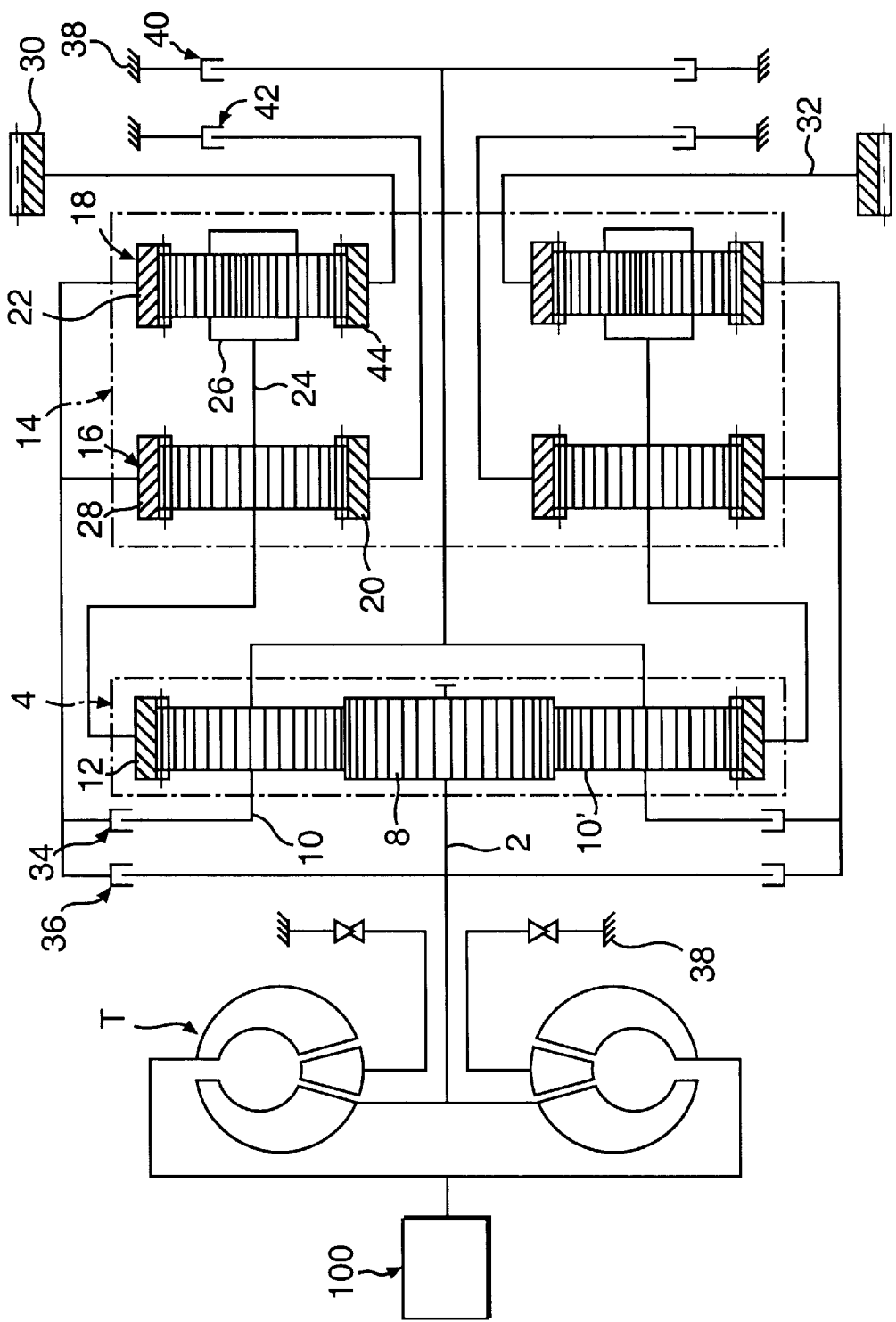
FIG. 13 is a schematic diagram of a powertrain according to an eighth embodiment of the present invention.

FIG. 13 shows a powertrain according to an eighth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. The second simple planetary gearset 18 is a double pinion planetary gearset. A planet carrier 24 and ring gear 28 of the first simple planetary gearset 16 are fixedly connected to a planet carrier 26 and ring gear 22 of the second simple planetary gearset 18, respectively.

In addition, a planet carrier 24 of the first simple planetary gearset 16 is fixedly connected to a ring gear 12 of the first planetary gear unit 4, while the ring gear 28 of the first simple planetary gearset 16 is variably connected to either a planet carrier 10 or a sun gear 8 of the first planetary gear unit 4. A first clutch 34 is interposed between the ring gear 28 and the planet carrier 10. A second clutch 36 is interposed between the ring gear 28 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 20 of the first simple planetary gearset 16 and the transmission housing 38 so that the sun gear 20 can selectively operate as a reacting element.

The sun gear 44 of the second simple planetary gearset 18 is fixedly connected to an output gear 30 to act as an output element.

Therefore, the first planetary gear unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the sun gear 44 of the second simple planetary gearset 18, a fifth operating element F having the ring gear 28 of the first simple planetary gearset 16 and the ring gear 22 of the second simple planetary gearset 18, a sixth operating element G having the planet carrier 24 of the first simple planetary gearset 16 and the planet carrier 26 of the second planetary gearset 18, and a seventh operating element H having the sun gear 20 of the first simple planetary gearset 16.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Ninth Embodiment

Figure 14:
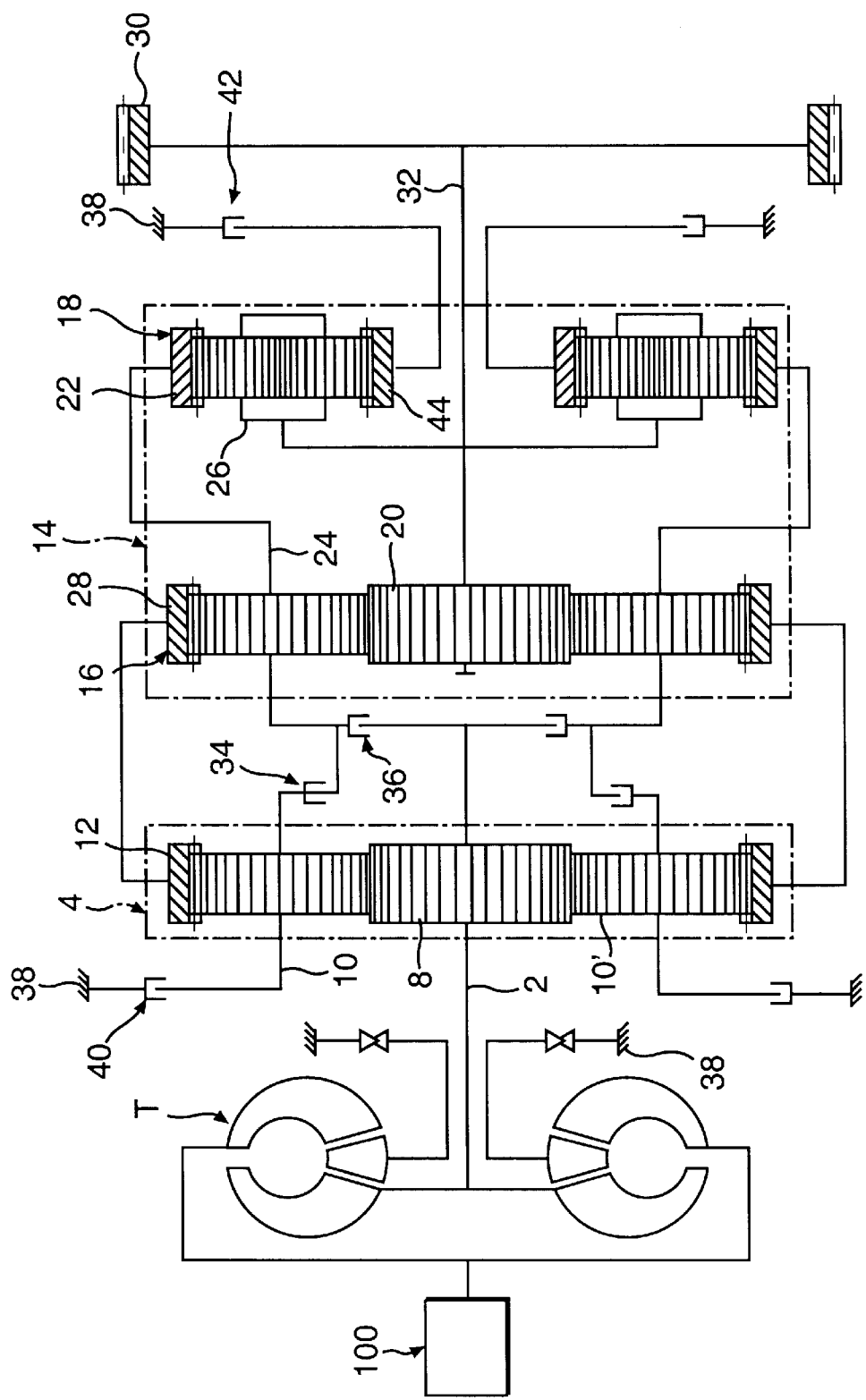
FIG. 14 is a schematic diagram of a powertrain according to a ninth embodiment of the present invention.

FIG. 14 shows a powertrain according to a ninth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18. The second simple planetary gearset 18 is a double pinion planetary gearset. A sun gear and planet carrier 20 and 24 of the first simple planetary gearset 16 are fixedly connected to a planet carrier 26 and ring gear 22 of the second simple planetary gearset 18, respectively.

In addition, a ring gear 28 of the first simple planetary gearset 16 is fixedly connected to a ring gear 12 of the first planetary gear unit 4, while the planet carrier 24 of the first simple planetary gearset 16 is variably connected to either a planet carrier 10 or a sun gear 8 of the first planetary gear unit 4. A first clutch 34 is interposed between the planet carrier 24 and the planet carrier 10. A second clutch 36 is interposed between the planet carrier 24 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 20 of the first simple planetary gearset 18 and the transmission housing 38 so that the sun gear 20 can selectively operate as a reacting element.

The sun gear 20 of the first simple planetary gearset 16 is fixedly connected to an output gear 30 to act as an output element.

Therefore, the first planetary gearset unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the sun gear 20 of the first simple planetary gearset 18 and the planet carrier 26 of the second planetary gearset 18, a fifth operating element F having the planet carrier 24 of the first simple planetary gearset 16 and the ring gear 22 of the second simple planetary gearset 18, a sixth operating element G having the ring gear 28 of the first simple planetary gearset 16, and a seventh operating element H having the sun gear 44 of the second simple planetary gearset 18.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Tenth Embodiment

Figure 15:
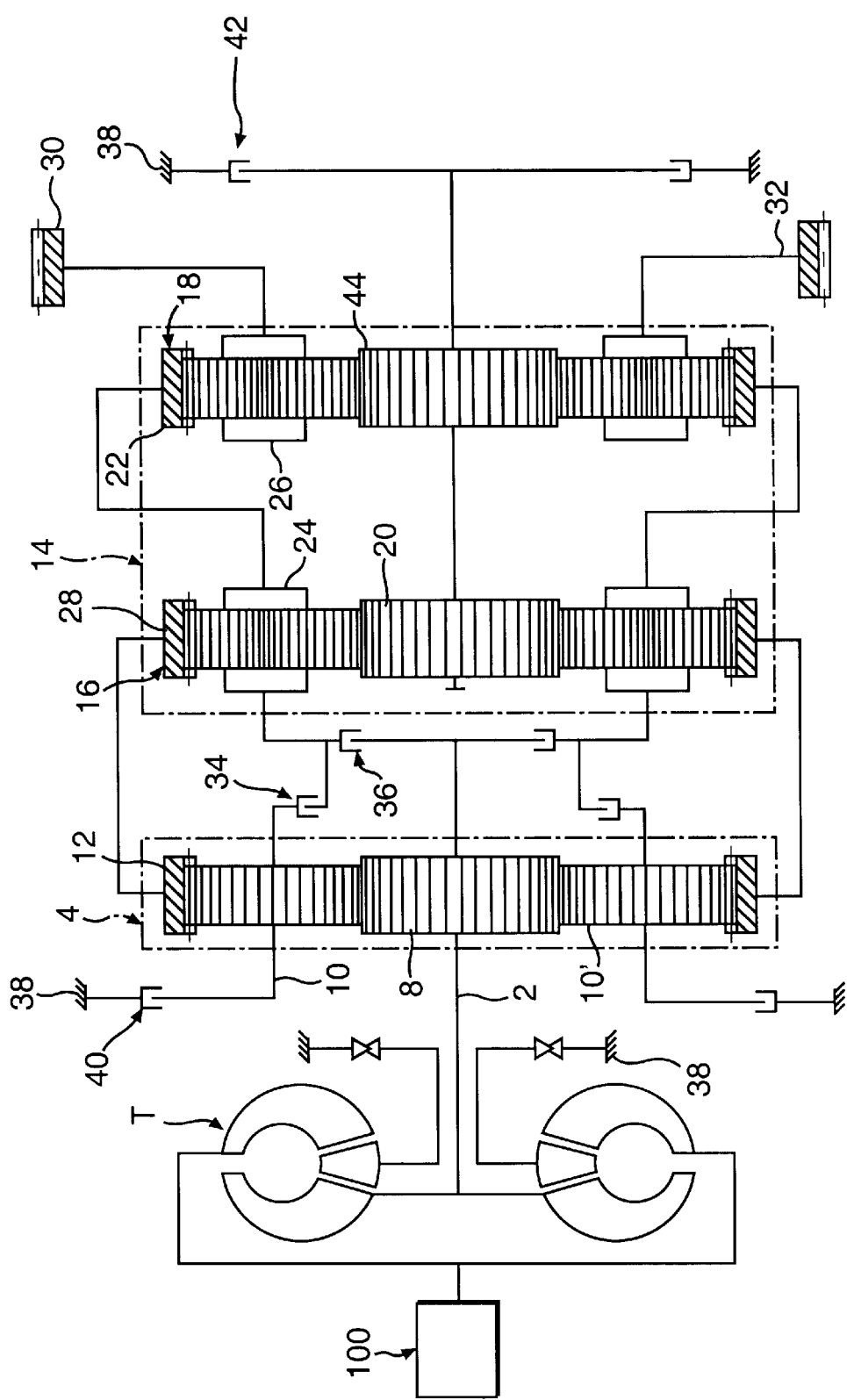
FIG. 15 is a schematic diagram of a powertrain according to a tenth embodiment of the present invention.

FIG. 15 shows a powertrain according to a tenth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18 each of which is a double pinion planetary gearset. A sun gear 20 and planet carrier 24 of the first simple planetary gearset 16 are fixedly connected to sun and ring gears 44 and 22 of the second simple planetary gearset 18, respectively.

In addition, a ring gear 28 of the first simple planetary gearset 16 is fixedly connected to a ring gear 12 of the first planetary gear unit 4, while the planet carrier 24 of the first simple planetary gearset 16 is variably connected to either a planet carrier 10 or a sun gear 8 of the first planetary gear unit 4. A first clutch 34 is interposed between the planet carrier 24 and the planet carrier 10. A second clutch 36 is interposed between the planet carrier 24 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 20 of the first simple planetary gearset 16 and the transmission housing 38 so that the sun gear 44 can selectively operate as a reacting element.

The planet carrier 26 of the second simple planetary gearset 18 is fixedly connected to an output gear 30 to act as an output element.

Therefore, the first planetary gear unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the planet carrier 26 of the second simple planetary gearset 18, a fifth operating element F having the planet carrier 24 of the first simple planetary gearset 16 and the ring gear 22 of the second simple planetary gearset 18, a sixth operating element G having the ring gear 28 of the first simple planetary gearset 16, and a seventh operating element H having the sun gears 20 and 44 of the first and second simple planetary gearsets 16 and 18.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Eleventh Embodiment

Figure 16:
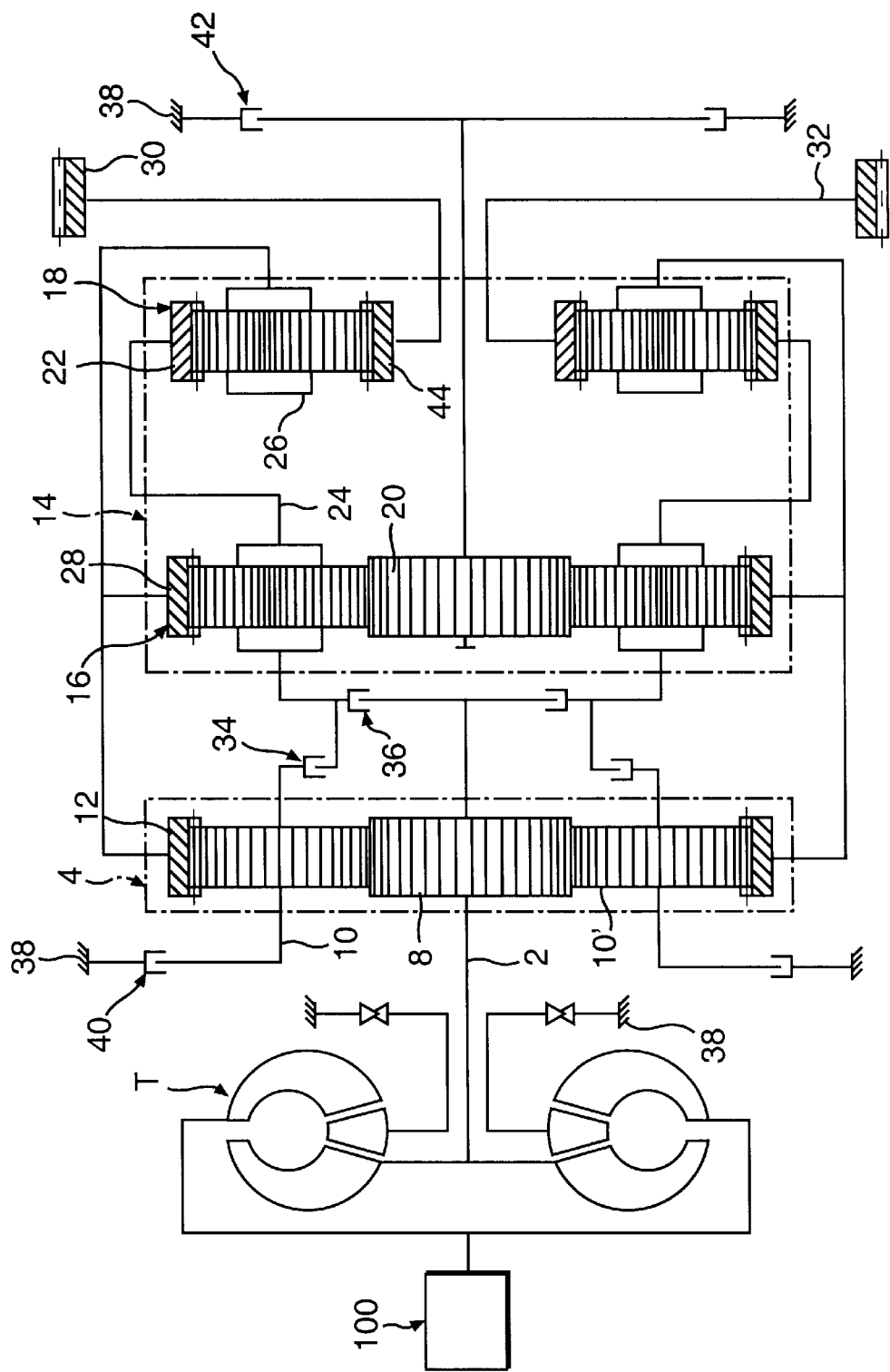
FIG. 16 is a schematic diagram of a powertrain according to an eleventh embodiment of the present invention.

FIG. 16 shows a powertrain according to an eleventh embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18 each of which is a double pinion planetary gearset. A planet carrier 24 and ring gear 28 of the first simple planetary gearset 16 are fixedly connected to a ring gear 22 and planet carrier 26 of the second simple planetary gearset 18, respectively.

In addition, the ring gear 28 of the first simple planetary gearset 16 is fixedly connected to a ring gear 12 of the first planetary gear unit 4, while the planet carrier 24 of the first simple planetary gearset 16 is variably connected to either a planet carrier 10 or a sun gear 8 of the first planetary gear unit 4. A first clutch 34 is interposed between the planet carrier 24 and the planet carrier 10. A second clutch 36 is interposed between the planet carrier 24 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 44 of the second simple planetary gearset 18 and the transmission housing 38 so that the sun gear 44 can selectively operate as a reacting element.

The sun gear 44 of the second simple planetary gearset 18 is fixedly connected to an output gear 30 to act as an output element.

Therefore, the first planetary gearset unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the sun gear 44 of the second simple planetary gearset 18, a fifth operating element F having the planet carrier 24 of the first simple planetary gearset 16 and the ring gear 22 of the second simple planetary gearset 18, a sixth operating element G having the ring gear 28 of the first simple planetary gearset 16 and the planet carrier 26 of the second simple planetary gearset 18, and a seventh operating element H having the sun gear 20 of the first simple planetary gearset 16.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Twelfth Embodiment

Figure 17:
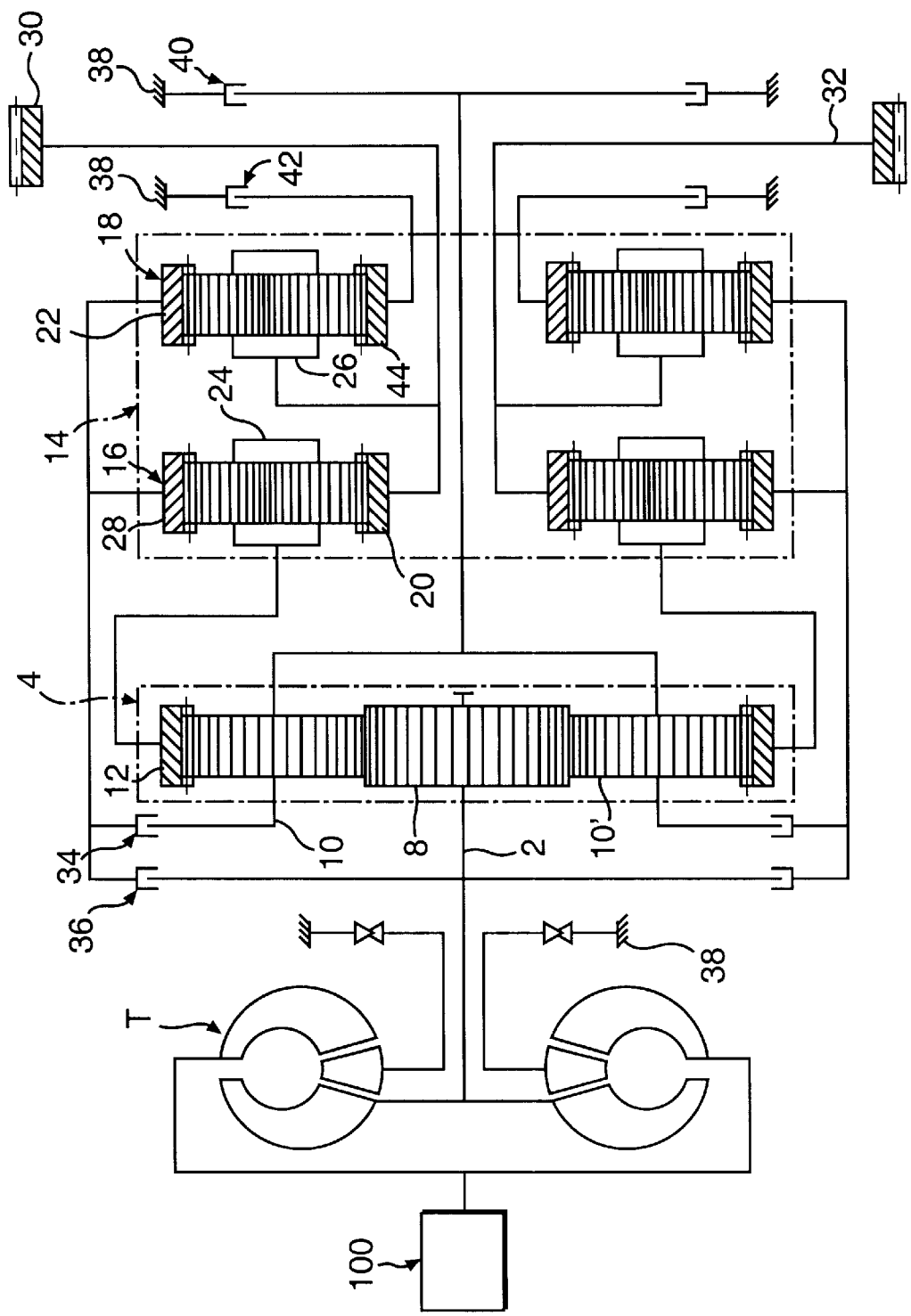
FIG. 17 is a schematic diagram of a powertrain according to a twelfth embodiment of the present invention.

FIG. 17 shows a powertrain according to a twelfth embodiment of the present invention.

The powertrain of this embodiment comprises first and second planetary gear units 4 and 14. The first planetary gear unit 4 is a simple planetary gearset, while the second planetary gear unit 14 is a compound planetary gearset having first and second simple planetary gearsets 16 and 18 each of which is a double pinion planetary gearset. Sun and ring gears 20 and 28 of the first simple planetary gearset 16 are fixedly connected to a planet carrier 26 and ring gear 22 of the second simple planetary gearset 18, respectively.

In addition, the planet carrier 24 of the first simple planetary gearset 16 is fixedly connected to a ring gear 12 of the first planetary gear unit 4, while the ring gear 28 of the first simple planetary gearset 16 is variably connected to either a planet carrier 10 or a sun gear 8 of the first planetary gear unit 4. A first clutch 34 is interposed between the ring gear 28 and the planet carrier 10. A second clutch 36 is interposed between the ring gear 28 and the sun gear 8.

A first brake 40 is interposed between the planet carrier 10 of the first planetary gear unit 4 and a transmission housing 38 so that the planet carrier 10 can be selectively operated as a reacting element. A second brake 42 is interposed between the sun gear 44 of the second simple planetary gearset 18 and the transmission housing 38 so that the sun gear 44 can selectively operate as a reacting element.

The planet carrier 26 of the second simple planetary gearset 18 is fixedly connected to an output gear 30 to act as an output element.

Therefore, the first planetary gearset unit 4 comprises first, second, and third operating elements A, B and C. That is, the first operating element A is the sun gear 8, the second operating element B is the planet carrier 10, and the third operating element C is the ring gear 12.

In addition, the second planetary gear unit 14 is comprised of a fourth operating element E having the sun gear 20 of the first simple planetary gearset 16 and the planet carrier 26 of the second simple planetary gearset 18, a fifth operating element F having the ring gears 28 and 22 of the first and second simple planetary gearsets 16 and 18, a sixth operating element G having the planet carrier 24 of the first simple planetary gearset 16, and a seventh operating element H having the sun gear 44 of the second simple planetary gearset 18.

The sixth operating element G of the second planetary gear unit 14 is fixedly connected to the third operating element C of the first planetary gear unit 4, the fifth operating element F of the second planetary gear unit 14 is selectively connected to the first and second operating elements A and B.

The difference of this embodiment from the first embodiment is that the operating elements of the second planetary gear unit 14. Since the powertrain of this embodiment is operated by the same operating elements as those of the first embodiment, the detailed description thereof will be omitted herein.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automatic transmission having a power train, comprising:

a first planetary gear unit comprising a first simple planetary gearset having first, second and third operating elements, said first operating element acting as an input element;

a second compound planetary gear unit comprising second and third simple planetary gearsets having fourth, fifth, sixth and seventh operating elements, said fourth operating element acting as an output element, said fifth operating element being variably connected to the first and second operating elements, and said sixth operating element being fixedly connected to the third operating element;

clutch means for variably connecting said fifth operating element to either the first operating element or the second operating element; and brake means for selectively fixing the second operating element and the seventh operating element so that the second and seventh operating elements can selectively act as a reacting element.

2. The automatic transmission of claim 1, wherein the first simple planetary gearset is a single pinion planetary gearset having a sun gear as the first operating element, a planet carrier as the second operating element, and a ring gear as the third ,operating element.

3. The automatic transmission of claim 1, wherein each of the second and third simple planetary gearsets is a single pinion planetary gearset, in which a sun gear and planet carrier of the second simple planetary gearset are respectively connected to a ring gear and planet carrier of the third simple planetary gearset; and wherein the fourth operating element becomes a combination of the sun gear of the second simple planetary gearset and the ring gear of the second simple planetary gearset;

the fifth operating element becomes a combination of the planet carrier of the second simple planetary gearset and the planet carrier of the third simple planetary gearset; and the sixth operating element becomes a ring gear of the second simple operating element;

the seventh operating element becomes a sun gear of the third simple operating element.

4. The automatic transmission of claim 1, wherein each of the second and third simple planetary gearsets is a single pinion planetary gearset, in which a sun gear and ring gear of the second simple planetary gearset are respectively connected to a sun gear and planet carrier of the third simple planetary gearset; and wherein the fourth operating element becomes the ring gear of the third simple planetary gearset;

the fifth operating element becomes a combination of the ring gear of the second simple planetary gearset and the planet carrier of the third simple planetary gearset;

the sixth operating element becomes a planet carrier of the second simple planetary gearset; and the seventh operating element becomes a combination of the sun gear of the second simple planetary gearset and the sun gear of the third simple operating element.

5. The automatic transmission of claim 1, wherein each of the second and third simple planetary gearsets is a single pinion planetary gearset, in which a ring gear and planet carrier of the second simple planetary gearset are respectively connected to a planet carrier and ring gear of the third simple planetary gearset; and wherein the fourth operating element becomes the sun gear of the third simple planetary gearset;

the fifth operating element becomes a combination of the ring gear of the second simple planetary gearset and the planet carrier of the third simple planetary gearset;

the sixth operating element becomes a combination of the planet carrier of the second simple planetary gearset and the ring gear of the third simple planet carrier; and the seventh operating element becomes a sun gear of the second simple planetary gearset.

6. The automatic transmission of claim 1, wherein the second simple planetary gearset is a double pinion planetary gearset, and the third simple planetary gearset is a single pinion planetary gearset, in which a sun gear and planet carrier of the second simple planetary gearset are respectively connected to a sun gear and planet carrier of the third simple planetary gearset; and wherein the fourth operating element becomes a ring gear of the third simple planetary gearset;

the fifth operating element becomes a combination of the planet carriers of the second and third simple planetary gearsets;

the sixth operating element becomes a ring gear of the second simple planetary gearset; and the seventh operating element becomes a combination of the sun gears of the second and third simple planetary gearsets.

7. The automatic transmission of claim 1, wherein the second simple planetary gearset is a double pinion planetary gearset, and the third simple planetary gearset is a single pinion planetary gearset, in which a planet carrier and ring gear of the second simple planetary gearset are respectively connected to a planet carrier and ring gear of the third simple planetary gearset; and wherein the fourth operating element becomes a sun gear of the third simple planetary gearset;

the fifth operating element becomes a combination of the planet carriers of the second and third simple planetary gearsets;

the sixth operating element becomes a combination the ring gears of the first and second simple planetary gearsets; and the seventh operating element becomes a sun gear of the second simple planetary gearsets.

8. The automatic transmission of claim 1, wherein the second simple planetary gearset is a double pinion planetary gearset, and the third simple planetary gearset is a single pinion planetary gearset, in which a sun gear and ring gear of the second simple planetary gearset are respectively connected to a ring gear and planet carrier of the third simple planetary gearset; and wherein the fourth operating element becomes a sun gear of the second simple planetary gearset and the ring gear of the third simple planetary gearset;

the fifth operating element becomes a combination of the ring gear of the second simple planetary gearset and the planet carrier of the third simple planetary gearset;

the sixth operating element becomes a planet carrier of the second simple planetary gearset; and the seventh operating element becomes a sun gear of the third simple planetary gearsets.

9. The automatic transmission of claim 1, wherein the second simple planetary gearset is a single pinion planetary gearset, and the third simple planetary gearset is a double pinion planetary gearset, in which a sun gear and ring gear of the second simple planetary gearset are respectively connected to a sun gear and ring gear of the third simple planetary gearset; and wherein the fourth operating element becomes a planet carrier of the third simple planetary gearset;

the fifth operating element becomes a combination of the ring gears of the second and third simple planetary gearsets;

the sixth operating element becomes a planet carrier of the second simple planetary gearset; and the seventh operating element becomes a combination of the sun gears of the second and third simple planetary gearsets.

10. The automatic transmission of claim 1, wherein the second simple planetary gearset is a single pinion planetary gearset, and the third simple planetary gearset is a double pinion planetary gearset, in which a planet carrier and ring gear of the second simple planetary gearset are respectively connected to a planet carrier and ring gear of the third simple planetary gearset; and wherein the fourth operating element becomes a sun gear of the third simple planetary gearset;

the fifth operating element becomes a combination of the ring gears of the second and third simple planetary gearsets;

the sixth operating element becomes a combination of the planet carriers of the second and third simple planetary gearsets; and the seventh operating element becomes a sun gear of the second simple planetary gearset.

11. The automatic transmission of claim 1, wherein the second simple planetary gearset is a single pinion planetary gearset, and the third simple planetary gearset is a double pinion planetary gearset, in which a planet carrier and sun gear of the second simple planetary gearset are respectively connected to a ring gear and planet carrier of the third simple planetary gearset; and wherein the fourth operating element becomes a combination of the sun gear of the second simple planetary gearset and the planet carrier of the third simple planetary gearset; the the fifth operating element becomes a combination of the planet carrier of the second simple planetary gearset and the ring gear of the third simple planetary gearset;

the sixth operating element becomes a ring gear of the second simple planetary gearset; and the seventh operating element becomes a sun gear of the third simple planetary gearsets.

12. The automatic transmission of claim 1, wherein each of the second and third planetary gearsets is a double pinion planetary gearset, in which a sun gear and planet carrier of the second simple planetary gearset are respectively connected to a sun gear and ring gear of the third simple planetary gearset; and wherein the fourth operating element becomes a planet carrier of the third simple planetary gearset;

the fifth operating element becomes a combination of the planet carrier of the second simple planetary gearset and the ring gear of the third simple planetary gearset;

the sixth operating element becomes a ring gear of the second simple planetary gearset; and the seventh operating element becomes a combination of the sun gears of the second and third simple planetary gearsets.

13. The automatic transmission of claim 1, wherein each of the second and third planetary gearsets is a double pinion planetary gearset, in which a planet carrier and ring gear of the second simple planetary gearset are respectively connected to a ring gear and planet carrier of the third simple planetary gearset; and wherein the fourth operating element becomes a sun gear of the second simple planetary gearset;

the fifth operating element becomes a combination of the planet carrier of the second simple planetary gearset and the ring gear of the third simple planetary gearset;

the sixth operating element becomes a combination of the ring gear of the second simple planetary gearset and the planet carrier of the third simple planetary gearset; and the seventh operating element becomes a sun gear of the third simple planetary gearset.

14. The automatic transmission of claim 1, wherein each of the second and third planetary gearsets is a double pinion planetary gearset, in which a sun gear and ring gear of the second simple planetary gearset are respectively connected to a planet carrier and ring gear of the third simple planetary gearset; and wherein the fourth operating element becomes a combination of the sun gear of the second simple planetary gearset and the planet carrier of the third simple planetary gearset;

the fifth operating element becomes a combination of the ring gears of the second and third simple planetary gearsets;

the sixth operating element becomes a planet carrier of the second simple planetary gearset; and the seventh operating element becomes a sun gear of the third simple planetary gearset.

15. The automatic transmission of claim 1, wherein the clutch means comprises a first clutch interposed between a planet carrier of the second simple planetary gearset and a planet carrier of the first simple planetary gearset, and a second clutch interposed between the planet carrier of the second simple planetary gearset and a sun gear of the first simple planetary gearset.

16. The automatic transmission of claim 1, wherein the clutch means comprises a first clutch, interposed between a ring gear of the second simple planetary gearset and a planet carrier of the first simple planetary gearset, and a second clutch interposed between the ring gear of the second simple planetary gearset and a sun gear of the first simple planetary gearset.

17. The automatic transmission of claim 1, wherein the brake means comprises a first brake interposed between a planet carrier of the first simple planetary gearset and the transmission housing and a second brake interposed between one of sun gears of the second and third simple planetary gearsets and the transmission housing.

* * * * *